May 21, 1940.  H. G. ROBINSON  2,201,408
ADJUSTABLE WATER BOX FOR WET ABRASIVE CUTTING MACHINES
Filed March 3, 1938  2 Sheets-Sheet 1
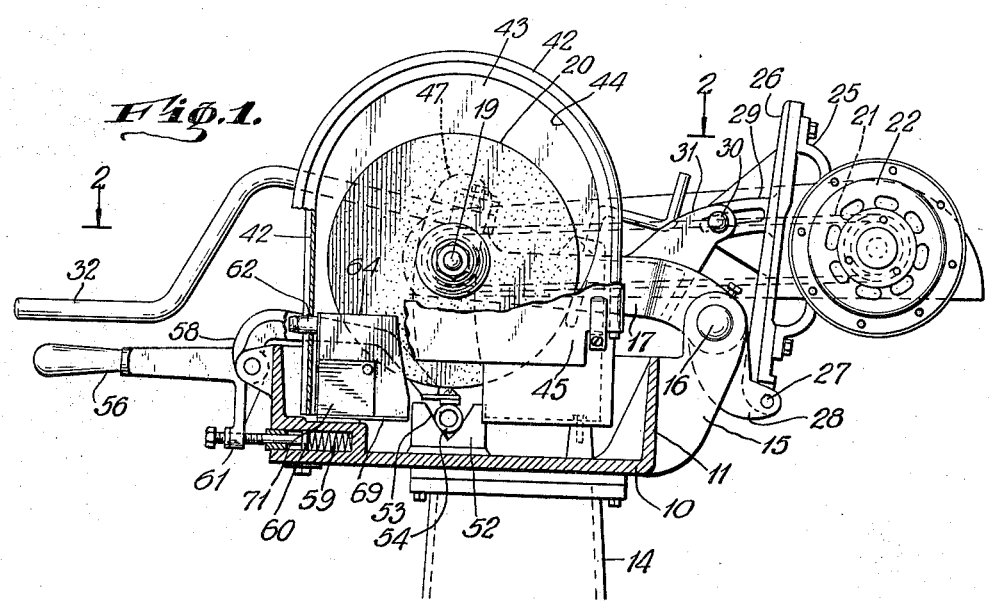
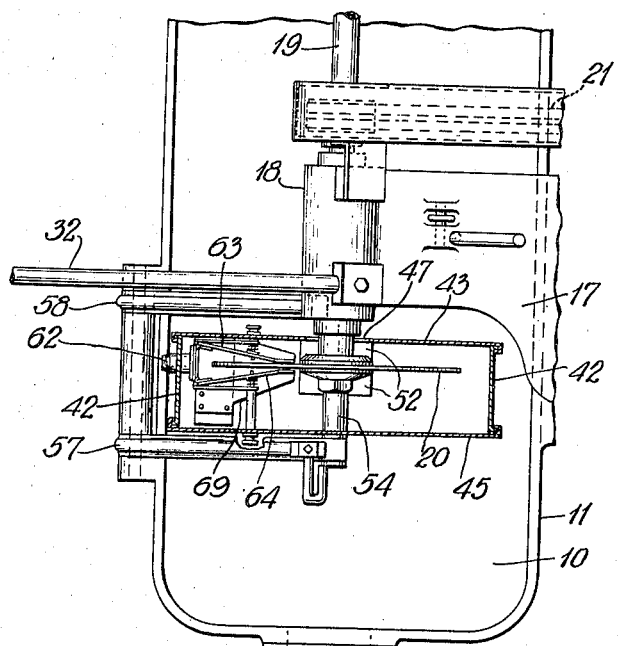 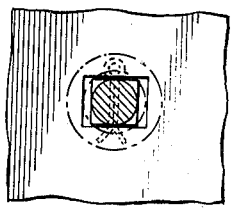
INVENTOR
HARRY G. ROBINSON
BY
ATTORNEY

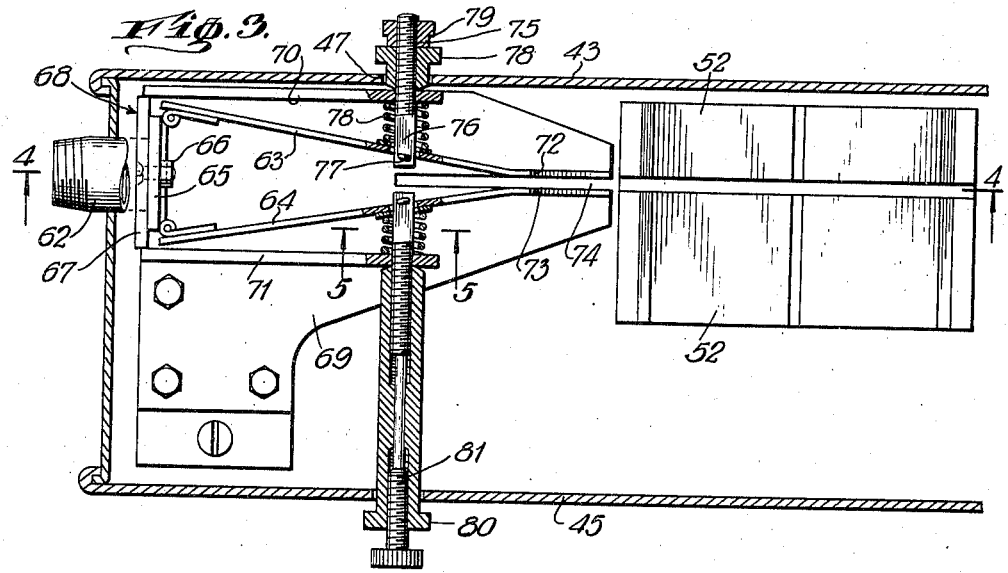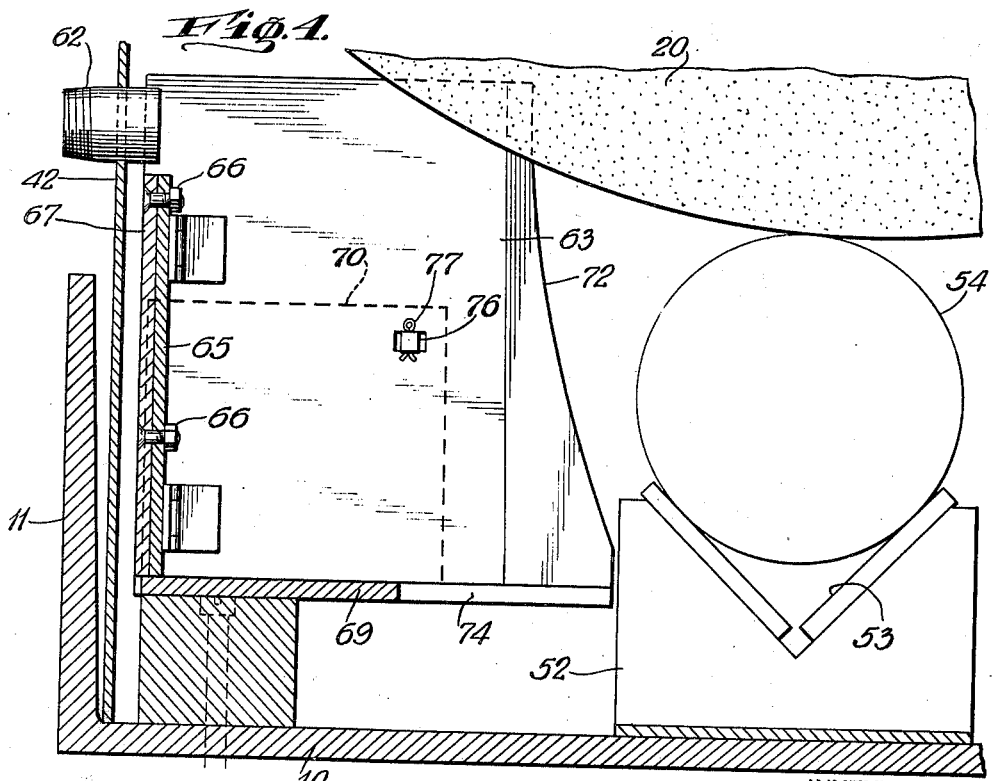

Patented May 21, 1940

2,201,408

UNITED STATES PATENT OFFICE 2,201,408

ADJUSTABLE WATER BOX FOR WET ABRASIVE CUTTING MACHINES

Harry G. Robinson, Stratford, Conn., assignor to American Chain & Cable Company, Inc., New York, N. Y., a corporation of New York Application March 3, 1938, Serial No. 193,627

11 Claims. (Cl. 51—98)

This invention relates to an improved apparatus for cutting various substances such as, various steels and other metals, plastic compositions, hard rubber, substances of a brittle nature, etc. The invention involves improved means for controlling the flow and distribution of a stream of water or other suitable liquid coolant on the surface of a cutting disc and on the work.

In the patent to Lewis et al., Reissue No. 20,466, of August 10, 1937, is disclosed an abrasive cutting machine to which my invention may be applied. In that machine, complete submergence or immersion of the metal during cutting operation is dispensed with and a stream of water is directed on the cutting disc and on the work in the region of cutting and means is provided therein for properly directing and confining such stream of water so that the region covering and surrounding the cut is virtually immersed in liquid. While the means shown in said patent is satisfactory, it has been found that the gaps between the sides of the cutting disc and the lips of the slot of the conduit may vary for some reason or other and that as a result unequal amounts of water on opposite sides of the cutting disc, cool opposite sides of the cutting edge unequally causing the cutting edge of the cutting disc to become bevelled resulting in angular cutting, the point of the bevel acting as a lead. It is, therefore, an object of my invention to make such lips of the conduit adjustable with respect to each other and to the sides of the cutting disc to feed the water uniformly against both sides of the cutting disc, to strip off excess coolant and to stop the disc from fluttering or vibrating. By means of this construction, the cutting edge of the cutting disc will retain its original parallel relation to the axis of the cutting disc, the disc will cut more accurately, and the interior of the water box will be readily accessible.

Other objects of the invention will appear from the following description taken in connection with the drawings, in which—

Fig. 1 is an elevation of a machine to which my invention has been shown as applied, parts of the machine being shown in section;

Fig. 2 is a plan view taken on the line generally indicated by the line 2—2 of Fig. 1;

Fig. 3 is a top plan view of the adjustable water box, etc., partly in section, on a larger scale;

Fig. 4 is a vertical sectional view on the line 4—4 of Fig. 3; and

Fig. 5 is a detail section on the line 5—5 of Fig. 4.

I have shown an embodiment of my invention in a cutting machine of the type disclosed in the patent above referred to merely for purposes of illustration. This machine comprises a bed 10 provided with vertical walls 11 forming, if desired, a reservoir or container for water or other liquid coolant employed in the cutting operation, this bed being supported on a suitable pedestal 14.

The bed may be provided with holes so that the coolant may drain off as with my improvement it is not necessary to submerge the work in a coolant.

The rear wall of the bed is provided with a pair of bearing brackets 15 for a pivot shaft 16 on a rocking frame 17 provided with a bearing 18 for a shaft 19 on which is secured a thin abrasive cutting disc 20.

The shaft 19 is provided with a pulley engaged by the belt drive 21 engaging the pulley carried by the shaft of the motor 22. For the purpose of adjusting the belt the motor may be mounted on a frame 25 secured to a supporting bracket 26 pivoted at 27 to arms 28 on the rocking frame 17. Bracket 26 has a lug 29 provided with an arcuate slot struck about the pivot 27 and engaged by a tightening bolt 30 carried by a lug 31 on the rocking frame 17. The motor and cutting disc are mounted on opposite sides of the pivot 16 in such a manner that normally the weight of the motor will tend to raise the cutting disc from the work. The frame 17 may be rocked on its pivot to shift the cutting disc to and from the work by any suitable handle 32.

The cutting disc is enclosed in a suitable safety guard comprising a sheet metal member 42 extending over and enclosing the disc and provided with an enclosing wall 43 on one side. On its opposite side it has an opening 44 of sufficient diameter to permit insertion and removal of the disc for application to and removal from the driving shaft. After the disc is applied, this opening is closed by cover plate 45 preferably detachably secured in position by any suitable means. The rear wall 43 is provided with an arcuate slot 47 through which the shaft 19 extends and which permits upward and downward movement of the disc. The guard may be mounted on the bed 10 by any suitable means.

The machine includes a pair of work supporting blocks 52 separated by a narrow space to permit the abrasive cutting disc to pass and operate between them. These blocks have properly shaped notches 53 to receive the work which in the drawings consists of a tube 54. Manually operating means is provided for clamping or holding the work in its supporting blocks. This means comprises a lever 56 pivoted on the forward wall 11 of the bed 10 and including a pair of spaced arms 57 and 58 extending at their free ends over the work 54. Adjustable resilient means for holding the clamps against the work is provided and includes a spring 59 operating against a plunger 60 adjustable in the lug 61 on the lever 56.

Supported in the sheet metal member 42 is a pipe 62 through which a liquid coolant such as water may be supplied to the abrasive cutting disc. Any suitable means may be provided for forcing coolant through this pipe. If desired the coolant used may be taken from a reservoir in the pedestal and pumped through the pipe by any suitable pumping mechanism also located in the pedestal.

In the patent referred to the stream of water from the pipe is directed against the sides of the abrading disc by means of a fixed conduit having fixed side walls or lips located at opposite sides of the disc. As the side walls of this conduit are not adjustable with respect to each other or to the abrading disc, they are not always spaced equal distances from the opposite sides of the abrading disc and consequently uneven amounts of coolant are supplied to or stripped off from opposite sides of the abrading disc which causes the disc to cup and to run unevenly, with the result that the cutting edge of the disc will be ground into non-parallel relation to the axis of the disc causing the disc in certain instances to produce a cut inclined to the normal of the work operated on. Uneven cooling of the opposite sides of the disc and cutting edge also caused the cutting edge to wear off unevenly.

For the purposes of avoiding these objections to the known structure, I have provided an adjustable water box which comprises side members or walls 63 and 64 hinged upon a plate 65 removably secured by bolts 66 to the end wall 67 of an open box like supporting frame 68 provided with a base 69 removably secured to and supported on the bed 10, and provided also with side walls 70 and 71. These plates may be of generally rectangular form elongated vertically with their inner edges arcuate as indicated. The free ends 72 and 73 of the plates are preferably angularly disposed with respect to the body of the plates and are disposed parallel to each other for cooperation with the opposite sides of the abrasive cutting disc as indicated more particularly in Figs. 2 and 3. The base 69 of the frame 68 extends close to the work support and is slotted as indicated at 74 to receive the cutting disc.

For the purpose of properly positioning the free ends of these plates with respect to the sides of the cutting disc, adjusting means is provided for each plate. The adjusting means for the plate 63 includes a rod 75 slidably supported in the side wall 70 of the frame 68 and extending outwardly through the rear wall 43 of the guard. The inner end 76 of the rod 75 is rectangular in cross section and slidably and non-rotatably passes through a rectangular hole in the plate 63 and is provided with a cotter pin 77 bearing against the inner face of the plate 63. Surrounding the rod 75 is a spring 78 bearing against the wall 70 and against a washer on the plate 63 operating to urge the plate 63 toward the cutting disc as determined by the adjustment effected by the thumb nut 78 which bears against the wall 70 and is locked in adjusted position by a lock nut 79. The plate 64 is adjusted by a thumb nut 80 provided with a long shank and which is locked in adjusted position by a lock bolt 81. Fig. 5 shows how the adjusting rods are held against rotation in the plates.

By means of the mechanism disclosed the plates 63 and 64 may be brought close to the side faces of the cutting disc to control the amount of water carried by the disc to the cutting position and to control the same so that equal amounts of water will be applied to and carried by opposite sides of the disc. In practice it has been found that a suitable adjustment has been made, when a few sparks will be produced between the plates 63 and 64 and the disc as the machine is run dry.

The mechanism disclosed provides means for directing and applying equal amounts of coolant to opposite sides of the cutting disc, with the result that the disc runs true and is evenly cooled, in consequence of which the sides of the cutting edge will wear evenly and a straight cut will be produced. Moreover, equal amounts of coolant will be carried to the work with the result that opposite walls of the cut in the work will be cooled equally and water lubricated evenly.

While I have disclosed my invention by illustrating and describing but one embodiment thereof, it is to be understood that other embodiments will be suggested to those familiar with this art after understanding my invention and that it is my intention to cover all such modifications as fall within the principles of my invention and the scope of the appended claims.

I claim:

1. The combination in an abrasive cutting machine comprising means for clamping the material to be cut, a thin abrasive disc and a frame on which the said disc is rotatably mounted, said frame being movably mounted to permit it to move the disc bodily in its plane of rotation toward and away from the material, of a conduit for liquid coolant mounted in the plane of rotation of the disc and including relatively movable side walls defining a narrow slot in which the outer portion of the disc rotates, and means for adjusting said walls to increase and decrease the width of said slot.

2. The combination in an abrasive cutting machine comprising means for clamping the material to be cut, a thin abrasive disc and a frame on which the said disc is rotatably mounted, said frame being movably mounted to permit it to move the disc bodily in its plane of rotation toward and away from the material, of a conduit for liquid coolant including relatively movable side walls defining a narrow slot in which said disc rotates, and means for adjusting said walls to space said walls at equal distances from the opposite sides of the disc.

3. The combination in an abrasive cutting machine comprising means for clamping the material to be cut, a thin abrasive disc and a frame on which the said disc is rotatably mounted, said frame being movably mounted to permit it to move the disc bodily in its plane of rotation toward and away from the material, of a conduit for liquid coolant including a base and relatively movable side walls defining a narrow slot in which said disc rotates, and means for adjusting said walls to space said walls at equal distances from the opposite sides of the disc.

4. The combination in an abrasive cutting machine comprising means for clamping the material to be cut, a thin abrasive disc and a frame on which the said disc is rotatably mounted, said frame being movably mounted to permit it to move the disc bodily in its plane of rotation toward and away from the material, of a conduit for liquid coolant mounted in the plane of rotation of the disc, said conduit including side walls converging toward the disc and the axis of rotation of the disc defining a narrow slot through which the edge of the disc rotates, said side walls being pivotally mounted for movement of their free ends toward and away from the sides of said disc, and means for individually positioning said side walls to adjust the clearances on each side of said disc.

5. The combination in an abrasive cutting machine comprising means for clamping the material to be cut, a thin abrasive disc and a frame on which the said disc is rotatably mounted, said frame being movably mounted to permit it to move the disc bodily in its plane of rotation toward and away from the material, of a conduit for liquid coolant mounted in the plane of rotation of the disc, said conduit including side walls converging toward said disc and the axis of rotation of the disc defining a narrow slot through which the edge of the disc rotates, said side walls being mounted for movement toward and away from the sides of said disc, and means for individually positioning said side walls to provide for equal clearances on the sides of said disc.

6. The combination in an abrasive cutting machine comprising means for clamping the material to be cut, a thin abrasive disc and a frame on which the said disc is rotatably mounted, said frame being movably mounted to permit it to move the disc bodily in its plane of rotation toward and away from the material, of a member provided with a conduit for liquid coolant mounted in the plane of rotation of the disc, said conduit comprising hinged rectangular plates lapping the opposite sides of said disc, the corners of said plates overlapping said disc at a point inside of the outer periphery thereof, and means for moving said members to converge towards the sides of said disc in the direction toward the axis of the disc and to hold them in said converging position, the direction of rotation of the disc being such that the various areas of the disc will leave the slot formed between said plates in the direction in which said plates converge.

7. The combination in an abrasive cutting machine comprising means for clamping the material to be cut and a thin abrasive disc, of a conduit for liquid coolant mounted in the plane of rotation of the disc, including side walls converging toward the disc and the axis of rotation of the disc defining a narrow slot through which the edge of the disc rotates, said side walls being pivotally mounted for movement of their free ends toward and away from the sides of said disc, and means for positioning said side walls to adjust the clearances on each side of said disc.

8. The combination in an abrasive cutting machine comprising means for clamping the material to be cut and a thin abrasive disc, of a conduit for liquid coolant mounted in the plane of rotation of the disc, said conduit including side walls converging toward said disc and the axis of rotation of the disc defining a narrow slot through which the edge of the disc rotates, said side walls being mounted for movement toward and away from the sides of said disc, and mean for positioning said side walls to provide for equal clearances on the sides of said disc.

9. The combination in an abrasive cutting machine comprising means for supporting the material to be cut and a thin abrasive wheel, of a conduit for liquid coolant mounted in the plane of rotation of the disc, said conduit including side walls defining a narrow slot in which the outer portion of the disc rotates, and means for shifting said walls relatively to said disc to space said walls at equal distances from said disc.

10. The combination in an abrasive cutting machine comprising means for supporting the material to be cut and a thin abrasive wheel, of a conduit for liquid coolant comprising relatively movable side walls defining a slot in which the disk rotates, and spring means cushioning said side walls against movement away from each other.

11. The combination in an abrasive cutting machine comprising means for supporting the material to be cut and a thin abrasive wheel, of a conduit for liquid coolant comprising relatively movable side walls defining a slot in which the disk rotates, spring means cushioning said side walls against movement away from each other, and adjustable positive means for limiting movement of said side walls toward each other.

HARRY G. ROBINSON.